Patented Sept. 27, 1938

2,131,394

UNITED STATES PATENT OFFICE 2,131,394

PRODUCTION OF VEGETABLE CONCENTRATES

William H. Test, Los Angeles, Calif.

No Drawing. Application June 8, 1936,
Serial No. 84,165

11 Claims. (Cl. 87—28)

This invention relates to the production of vegetable concentrates, and particularly to the treatment of plant tissues or other vegetable substances containing vegetable pigments, for the purpose of extracting such pigments therefrom and recovering the extracted pigments in highly concentrated form and in such condition as to retain their valuable or characteristic properties during relatively long periods of storage or handling.

The principal object of the invention is to provide an advantageous method for producing such vegetable pigment concentrates, in which the loss or decomposition thereof during the process is prevented or inhibited, and by which a high percentage of the pigment or pigments contained in the vegetable substance may be recovered in concentrated form.

A further object of the invention is to recover such pigments in such highly concentrated form that the concentrated product may profitably be kept in cold storage and under such conditions as to enable preservation thereof for longer periods than has heretofore been possible.

A further object of the invention is to provide, in certain cases, for the separate extraction and recovery of vegetable pigments and protein concentrates from vegetable substances.

Other objects will be pointed out hereinafter or will be apparent from the following description.

The treatment herein described has been found to be particularly well adapted to the recovery of carotenoid pigments and/or chlorophyll pigments from such plant substances as alfalfa, lettuce, spinach, or other green leafed plants, carrots, and sweet potatoes, but may also be employed for the recovery of these or other desired vegetable pigments from other plant tissues, or even from micro-organisms in which such pigments occur, such as certain carotene-forming bacteria.

Such vegetable pigments, as extracted by the method herein described, usually contain certain vitamins or pro-vitamins. For example, carotene has the property of forming vitamin A within the bodies of animals, and is known as pro-vitamin A. Other vitamins, such as vitamin G and other members of the B complex, and/or vitamin E, may also be present in the vegetable substance treated, and may be recovered therefrom in concentrated form, either with or separately from the recovered pigment. An important object of this invention is to provide for an effective recovery of such vitamins or pro-vitamins present in vegetable substances, and to produce a concentrate or concentrates having a relatively high content of such vitamins or pro-vitamins.

Vegetable pigments such as carotene, xanthophyll, or chlorophyll, and particularly the vitamins and/or pro-vitamins contained therein, are subject to decomposition or alteration under conditions encountered in hitherto known methods for extraction and recovery thereof, such decomposition or alteration probably resulting from oxidation, polymerization, or other chemical or physical action occurring during one or more stages of such methods. For this reason, and also because of inability to obtain a high percentage of extraction of the desired pigment from the plant cells or tissues in which they are found, considerable difficulty has been experienced in obtaining concentrated products containing a high percentage of such pigments, or in obtaining a satisfactory recovery of the pigment content of the original vegetable substance.

Particular objects of the present invention are to prevent or very largely reduce the loss or destruction of such pigments, and particularly provitamin A (carotene) or other vitamin or provitamin, during the extraction and recovery process, and to obtain a high percentage of extraction of the pigment, and particularly the vitamin or pro-vitamin content thereof, contained in the original substance. The term "pigment" or "vegetable pigment", as hereinafter employed, will be understood to include vitamins and/or pro-vitamins present in the vegetable substance treated, and capable of extraction by the method described.

I have found that all of the above objects may be attained, and a large percentage of the original pigment content recovered in concentrated form, by grinding, macerating or otherwise treating the vegetable substance to reduce it to finely divided form, extracting the desired pigment from the finely divided vegetable substance by means of a suitable liquid solvent medium while maintaining an acid condition therein, and then separating the resulting solution containing said pigment and recovering the pigment therefrom.

The process may be applied to plant or vegetable substances either in freshly cut or harvested condition, containing all or a large proportion of the original moisture content of the substance (commonly referred to in the case of some substances as a "green" condition), or in air-dried or otherwise partially dried condition, in which a considerable portion of the original moisture content has been removed, it being understood that it is generally impossible to completely remove water from plant or vegetable substances by ordinary drying methods without destroying or deleteriously affecting at least a large proportion of the pigment or pigments contained therein.

According to the present invention, the pigment-containing vegetable substance, usually containing some of its original moisture content, is subjected to a disintegrating operation to convert it to the form of a pulp or meal containing the disintegrated solids, and the vegetable pigments are then extracted by means of petroleum ether or other suitable liquid solvent, having a high solvent action for vegetable pigment material present in said substance, preferably in conjunction with another liquid, such as methyl alcohol, which is miscible with water and which has a dehydrating action on the vegetable substance. This combined extracting and dehydrating operation is conducted in the presence of sufficient acid to give a moderate acidity, corresponding preferably to a pH value between about 2 and about 5, and most preferably between 3 and 4, in the aqueous phase present, it being understood that said aqueous phase, while containing water derived from the vegetable substance, may consist largely of the alcohol or other water-miscible dehydrating liquid which is preferably employed. The maintenance of this acid condition during this operation serves not only to prevent or retard the decomposition of the pigment or pigments present, but also to effect removal of a higher percentage of such pigment or pigments from the vegetable substance, which may be due to increased permeation of the acidified solution through the walls of the plant cells or tissues, or to an actual destruction or breaking down of such cells or tissues. From the standpoint of preventing decomposition of the pigment, I find it advantageous to add the acidifying agent, in suitable amount, at as early a stage in the process as is practicable, and to maintain the acid condition until the pigment is removed from contact with the aqueous liquid phase.

In applying the process to "green" vegetable substances having a fairly high water content, such as green alfalfa, I prefer to first express or otherwise remove a considerable proportion of the aqueous liquid content or "juice" from the partially or completely disintegrated or "pulped" vegetable substance prior to the extraction of the pigment, the proportion of liquid thus removed preferably being sufficient to reduce the water content of the vegetable substance to about 60% or less, and more preferably to about 50% or less, by weight. This preliminary removal of the juice is preferably conducted in the presence of an acid and also in the presence of an added water-miscible liquid, such as methyl alcohol (or methanol), which has a coagulating action on certain protein materials present and thus serves to prevent fine particles of pulp, containing pigment, from being expressed or removed with the juice. This added water-miscible liquid also serves to promote the removal or separation of water from the disintegrated vegetable substance. This preliminary expressing operation is preferably conducted in the substantial absence of an added liquid having a high solvent action on the pigment substances which are to be subsequently extracted. The acid and coagulating liquid employed in this step may advantageously, although not necessarily, be added prior to or during the disintegrating of the vegetable substance to convert the same to the proper state of physical subdivision. The temperature is advantageously kept low throughout the process, in order to prevent deterioration of heat sensitive constituents which are to be recovered, and also to prevent loss of solvent. Atmospheric temperature is generally satisfactory, although temperatures below atmospheric may sometimes be advantageously employed, particularly if the solvent employed is highly volatile at ordinary atmospheric temperature. In other cases, temperatures somewhat above atmospheric may be used, however.

I will now describe, in greater detail, a preferred embodiment of the process as applied to treatment of a green vegetable substance and, more specifically, green alfalfa, it being understood that the process as so described is, in all essential respects, applicable to other green or fresh vegetable substances.

Freshly cut green alfalfa is first broken up into particles of fairly small size, as by chopping, shredding, crushing, or grinding, and is disintegrated to form a pulp, in the presence of a water-miscible alcohol and an acidifying agent. Either ethyl alcohol ($C_2H_5OH$) or methyl alcohol ($CH_3OH$) may be used, the latter being usually preferable on account of its lower cost. As noted above, the chief purpose of the liquid so added is to coagulate certain protein materials present, and it will be understood that other water-miscible liquids having this property, such as acetone, may also be used, and that references herein to "alcohol" in connection with this part of the process will be understood to include any such other liquid. In this operation, a considerable proportion of the juice is liberated from the vegetable substance, forming a water-alcohol liquid phase, and the amount of alcohol added is preferably sufficient to provide from about 15% to 25% of alcohol in this liquid phase, particularly advantageous results having been obtained with an alcohol content of about 20%. The acidifying agent may be any acid which has no deleterious action on the pigments and/or vitamins which it is desired to recover from the vegetable substance, such as hydrochloric or sulphuric acid, and is preferably added in such amount as to produce, in the liquid phase, a pH value between about 2 and about 5. The alcohol coagulates some of the protein substances present in the pulp so as to prevent loss of fine pulp particles in the subsequent treatment to express or remove the liquid phase from the solids, while the acid prevents or minimizes decomposition of the pigment during this part of the process, probably by destroying or inhibiting active bacteria or enzymes present which would otherwise rapidly destroy the pigment. The alcohol also serves to prevent the growth of mold in the pulp.

The pulp is then subjected to a suitable operation to separate a large proportion of the liquid phase, containing the liberated juice of the vegetable substance, from the disintegrated solids, as by means of a hydraulic press, pressing rolls, or a centrifugal extractor. I have found that as much as 60% or more of the original water content of fresh alfalfa may be removed in this manner, with practically no loss of carotene, and that the water content of the vegetable solids remaining in the "press cake" may be reduced materially below 50% by weight. The above described pulping and expressing operations may be carried out at about atmospheric temperature, although somewhat higher or lower temperatures may in some cases be employed.

The aqueous liquid or "juice" thus obtained contains certain dissolved protein constituents of the alfalfa, as well as certain vitamins, such as vitamin G or other vitamins of the so-called "B complex", which are soluble in the water-alcohol medium, and such liquid may be treated in any desired manner to recover these dissolved materials, and preferably to also recover the alcohol. For example, the alcohol may be removed by distillation at any suitable temperature and pressure, and recovered by condensation, and the remaining aqueous liquid, which will ordinarily contain about 10% by weight of dissolved proteins, together with some vitamins such as above mentioned, may be heated, preferably by spray-drying, to evaporate the water and recover such proteins and vitamins in dry, solid form.

The residual solids or "press cake" remaining after the above-described expressing or extracting operation are broken up, as by a light crushing or grinding operation, it being understood that any desired amount of additional grinding or disintegration may be effected at this stage of the process. Furthermore, if desired, the material may be heated, as by passing a stream of hot gas in contact therewith for a very short time during grinding thereof, to further reduce the water content.

The vegetable solids are then brought into contact with a suitable liquid solvent medium. Said liquid medium includes a liquid having a high solvent action on the vegetable pigments which it is desired to extract, and said solvent liquid should also be one which is substantially immiscible or of very limited miscibility with water. I have obtained the best results with the use of petroleum ether, although other liquid hydrocarbons such as gasoline, kerosene, or liquid butane which exists as a gas at ordinary atmospheric temperature and pressure may be used. In the case of butane, the subsequent separation of the solvent may be effected by simply reducing the pressure and distilling off the solvent at atmospheric temperature. The proportion of such liquid solvent used should be sufficient to dissolve substantially all of the desired pigment material contained in the vegetable solids, and may be determined from a knowledge of the proportion of such pigment material present, and the solubility thereof in the particular solvent employed.

I also prefer to use, in addition to the main liquid solvent, another liquid which is miscible with water and is of limited solubility in said liquid solvent, and which also tends to absorb water from the vegetable substance, or to exert a dehydrating action thereon. This additional liquid should also be one which, when suitably diluted with water, has relatively little solvent action for the vegetable pigment, as compared with the solvent action of the main liquid solvent. As examples of suitable liquids for this purpose, I have used methyl alcohol or acetone, although other liquids having similar properties may also be used. The proportion of this water-miscible liquid used should be such that the resulting aqueous phase containing said liquid, together with water derived from the vegetable solids and any water which may be associated with this added liquid, will have a water content of not more than about 10%, and this proportion may be calculated in any particular case from a knowledge of the water content of the vegetable solids and the percentage of water associated with said liquid as added.

The liquid or liquids used in this operation are also acidified, by addition of sufficient acid to maintain a moderate acidity in the aqueous liquid phase, such acidity corresponding preferably to a pH value between about 2 and about 5, and most preferably between 3 and 4.

The vegetable solids are maintained in contact with the above-described liquid mixture, preferably with agitation, for a sufficient period to effect the desired extraction and solution of the vegetable pigment and the dehydration of the solids. This treatment may be carried out at ordinary atmospheric temperature, although higher or lower temperatures may be employed if desired. The dehydrating liquid and solvent liquid cooperate in effecting the extraction of the pigment from the vegetable substance, the miscibility of the dehydrating liquid with the water present and the ability of this liquid to withdraw water from the vegetable cells or tissues serving to facilitate the initial removal of the pigment, and the pigment thus removed being then transferred to the solvent liquid phase due to its greater solubility therein. The degree of removal of water from the vegetable substance may vary, for example, from about 40% to 95%. A minor proportion of certain protein substances present may also be extracted in this operation, and some of the proteins so extracted may be dissolved in the aqueous phase containing the added water-miscible liquid.

The remaining solids are then separated from the liquid, as by filtering or by centrifugal separation, and the solids may, if desired, be washed with a further quantity of liquid. For this purpose I prefer to wash first with a suitable quantity of dehydrating liquid such as methyl alcohol, and then with a suitable quantity of pigment solvent such as petroleum ether, although these two liquids may be employed together, or in reverse order, for this purpose if desired. This wash liquid may be combined with the main portion of liquid separated by filtration or the like, or may be treated separately to recover extracted materials therefrom, or may be used in whole or in part in the liquid mixture employed in the extraction of a further quantity of vegetable solids. The washed solids may then be heated to remove remaining solvent liquid or dehydrating liquid, and the liquid so evaporated is preferably recovered by condensation.

The liquid extract, after separation of the residual solids therefrom as above described, is then treated (either alone or together with all or a portion of the wash liquid) to effect a separation of the two different liquid constituents, such as the alcohol and the petroleum ether, and the two fractions thus obtained may be separately treated to recover the materials dissolved therein.

For the purpose of separating these two liquid phases, I may add to the mixed liquid extract sufficient water to so increase the water content of the phase containing the dehydrating liquid, as to provide a clean and substantially complete separation between this phase and the main solvent liquid. The increase in the water content of this phase, at this stage of the process, also decreases the solubility of pigment material therein, so that any pigment dissolved in this phase is released therefrom and transferred substantially completely to the main solvent liquid phase. For this purpose, the amount of water added is preferably sufficient to increase the water content of this phase to 30% or more. The mechanical separation of these two liquid phases may be effected in any suitable manner, as by allowing the same to separate by gravity and form separate layers, and then decanting the upper layer, or preferably, drawing off the heavier dehydrating liquid-water phase from beneath the main solvent liquid phase. The resulting main solvent liquid phase containing dissolved pigment material is preferably washed one or more times with a small quantity of water to remove remaining traces of dehydrating liquid.

The recovery of the dissolved pigments from the main solution may be carried out by evaporating the solvent, preferably but not necessarily at a temperature below atmospheric temperature, such as about 0° C. to 10° C., employing a partial vacuum if necessary. The evaporated solvent is preferably recovered by condensation, and the distillation is preferably continued until substantially all the solvent is driven off, leaving the pigments in a highly concentrated form.

The pigment concentrate thus recovered is generally a heavy waxy or oily material, and ordinarily contains both pro-vitamin pigments and vitamins, as well as non-vitamin pigments. This concentrate may be sold or used in this form, or may be further processed according to any known or suitable methods, to separate the vitamins and/or pro-vitamins, such as vitamin E and/or carotene (pro-vitamin A), from the non-vitamin pigments such as chlorophyll or xanthophyll, and may also be processed to separate any proteins or protein-like substances contained therein.

The dehydrating liquid fraction may be separately treated to recover the dehydrating liquid and any dissolved substances that may be of value. This may also be done by distilling off the dehydrating liquid under any suitable temperature and pressure conditions, and condensing the evaporated liquid. The residue may then be heated, preferably by spray drying, to remove the water present and recover the solids in substantially dry form. In some cases, this fraction may advantageously be combined with the expressed juice from the preliminary expressing operation, and these combined liquids treated to recover the dissolved constituents, this procedure being particularly applicable where the same liquid, such as methyl alcohol, is used in both the preliminary expressing operation and in the extracting operation, so that substantially all of this liquid employed in both these operations may be recovered in a single distillation process.

In applying the process to dried vegetable substances, such as air-dried alfalfa, substantially the same procedure may be employed, although in such cases there will be no preliminary expressing of juice. Such a dried vegetable substance may be ground or otherwise disintegrated to form a meal comparable to what is commercially known as "alfalfa leaf meal". This ground or disintegrated material may then be subjected to an extracting operation in substantially the same manner as the above-described residual solids or "press cake" remaining after the preliminary expressing of the juice from the green alfalfa or other green vegetable substance.

The following are given as specific examples of the method described herein:

1. *Green alfalfa.*—Approximately 390 grams of green alfalfa were subjected to a grinding operation to reduce the solids to finely divided condition and form a wet pulp, which contained 93.6 grams of solids and 296.4 grams of water. Methanol and hydrochloric acid were then added in sufficient amount to provide 20% $CH_3OH$ by volume in the aqueous liquid phase and to provide an acidity of N/10 HCl on the basis of combined methanol and water. The total weight of this mixture was 465 grams. The juice was then expressed in a hydraulic press. The resulting press cake weighed 165.2 grams, and the juice weighed 295.8 grams, having a pH value of 3.7. The loss in this operation was about 4.0 grams, principally due to juice held in the filter-press cloth.

The press cake, which contained about 48% water, was broken up and agitated for one hour with 200 ml. of N/10 solution of HCl in 99.5% $CH_3OH$ and 100 ml. of petroleum ether, at atmospheric temperature. The mixture was then filtered by suction, washed first with 100 ml. of 99.5% $CH_3OH$ and then with 200 ml. petroleum ether, and the washings were added to the filtrate. The remaining alfalfa solids were heated to distill off the methanol and petroleum ether, which were recovered by condensation. The residue, weighing 74.0 grams, had a dull grayish white color.

The methanol-petroleum ether extract was diluted by the addition of 50 ml. of water, which sufficiently reduced the $CH_3OH$ concentration to provide a clear separation between the methanol-water phase and the petroleum ether phase, and these two fractions were separated in a separatory funnel.

The methanol-water fraction was combined with the expressed juice from the first-mentioned expressing operation, and the mixture heated to distill off the methanol and part of the water, and then completely dried under vacuum over sulphuric acid at atmospheric temperature. The residual solids weighed 9.1 grams and contained approximately 95% proteins.

The petroleum ether fraction was heated to about 40° or 45° C., under sufficiently reduced pressure to distill off the petroleum ether, which was recovered by condensation. The residual solids weighed 7.5 grams, and contained substantially all of the pigments originally present in the alfalfa, together with a considerable amount of vitamins, probably consisting principally of vitamin E.

The recovery of solids contained in the original alfalfa may be summarized as follows:

|  |  | Per cent |
|---|---|---|
| Residue after extraction | 74.0 grams | =79.1 |
| Total solids extracted by methanol and water (protein concentrate) | 9.1 grams | = 9.7 |
| Solids recovered from petroleum ether extract (pigment concentrate) | 7.5 grams | = 8.0 |
| Total |  | 96.8 |
| Loss |  | 3.2 |

2. *Dried alfalfa.*—Ten grams of air-dried alfalfa containing 7.6% water were ground to pass through a 40-mesh screen, and agitated for one hour at atmospheric temperature with 100 ml. of N/10 solution of HCl in 99.5% methanol and 50 ml. of petroleum ether. The mixture was then filtered, washed first with 25 ml. of 99.5% $CH_3OH$ and then with 50 ml. of petroleum ether, and the washings were added to the filtrate. The remaining solids were heated to distill off the methanol and petroleum ether, which were recovered by condensation. The residue weighed 7.5 grams.

The extract was diluted by the addition of 75 ml. of water which reduced the methanol concentration sufficiently to provide a clear separation, and the methanol-water and petroleum ether fractions were separated in a separatory funnel.

The methanol-water fraction was heated to distill off the methanol and a part of the water, and then dried under vacuum over sulphuric acid at room temperature. The residual solids weighed .98 gram and contained 95% proteins.

The petroleum ether fraction was heated to about 40° or 45° C., under sufficiently reduced pressure to distill off the petroleum ether, which was recovered by condensation. The residual solids weighed .80 gram, and contained substantially all the pigments originally present in the alfalfa, together with some vitamins.

The recovery of solids contained in the original air-dried alfalfa containing 7.6% moisture may be summarized as follows:

|  | Per cent |
| --- | --- |
| Residue after extraction | 7.5 grams=81.1 |
| Solids extracted by methanol and water (protein concentrate) | .98 gram =10.6 |
| Solids recovered from petroleum ether extract (pigment concentrate) | .80 gram = 7.96 |
| Total | 99.66 |
| Loss | .34 |

I claim:

1. The method of producing a vegetable pigment concentrate from a vegetable substance containing water and also containing a vitamin or pro-vitamin vegetable pigment which is substantially insoluble in water, which comprises: subjecting such a vegetable substance, in divided condition, to extraction with a substantially water-immiscible liquid having a high solvent action for said pigment in the presence of sufficient acid to provide a moderate acidity in the aqueous phase during said extraction, to extract said pigment from the vegetable substance and cause the extracted pigment to be dissolved substantially wholly in said liquid solvent; separating the liquid solvent containing said dissolved pigment from the remaining undissolved vegetable solids and from the aqueous phase; and recovering said pigment from said solvent.

2. The method of producing a vegetable pigment concentrate from a vegetable substance containing water and also containing a vitamin or pro-vitamin vegetable pigment, which comprises: subjecting such a vegetable substance, in divided condition, to extraction with a hydrocarbon liquid having a high solvent action for said pigment, in the presence of sufficient acid to provide a moderate acidity in the aqueous phase during said extraction, to extract said pigment from the vegetable substance and cause the extracted pigment to be dissolved substantially wholly in said hydrocarbon liquid; separating the hydrocarbon liquid containing said dissolved pigment from the remaining undissolved vegetable solids and from the aqueous phase; and recovering said pigment from said solvent.

3. The method of producing a vegetable pigment concentrate from a vegetable substance containing water and also containing a vitamin or pro-vitamin vegetable pigment, which comprises: subjecting said vegetable substance, in divided condition, to extraction with a hydrocarbon liquid having a high solvent action for said pigment, together with another liquid which is miscible with water and of limited solubility in said hydrocarbon liquid and which has a dehydrating action on said vegetable substance, in the presence of sufficient acid to provide a moderate acidity in the aqueous phase containing said other liquid and water removed from said vegetable substance, to extract said pigment from the vegetable substance and cause the extracted pigment to be dissolved substantially wholly in said hydrocarbon liquid; separating said hydrocarbon liquid and said aqueous phase from remaining undissolved vegetable solids; separating the hydrocarbon liquid containing the dissolved pigment from said aqueous phase; and recovering said pigment from said hydrocarbon liquid.

4. The method of producing a vegetable pigment concentrate from a vegetable substance containing water and also containing a vitamin or pro-vitamin vegetable pigment, which comprises: subjecting such a vegetable substance, in divided condition, to extraction with a hydrocarbon liquid having a high solvent action for said pigment, together with methyl alcohol, in the presence of sufficient acid to provide a pH between about 2 and about 5 in the aqueous phase containing said methyl alcohol and water removed from said vegetable substance, to extract said pigment from said vegetable substance and cause the extracted pigment to be dissolved substantially wholly in said hydrocarbon liquid; separating said hydrocarbon liquid and said aqueous phase from the remaining undissolved vegetable solids; separating said hydrocarbon liquid containing the dissolved pigment from said aqueous phase; and recovering said pigment from said hydrocarbon liquid.

5. The method of producing a vegetable pigment concentrate from a vegetable substance containing water and also containing a vitamin or pro-vitamin vegetable pigment which is substantially insoluble in water, which comprises: subjecting such a vegetable substance to a disintegrating operation to form a pulp containing water and divided vegetable solids; adding sufficient acid to provide a moderate acidity in the aqueous liquid present in said pulp; separating the major portion of said aqueous liquid from the remaining vegetable solids containing said pigment; subjecting the separated vegetable solids to extraction with a hydrocarbon liquid having a high solvent action for said pigment, in the presence of sufficient acid to provide a moderate acidity in the aqueous phase containing water remaining in said separated vegetable solids, to extract said pigment from said solids and cause the extracted pigment to be dissolved substantially wholly in said hydrocarbon liquid; separating said hydrocarbon liquid containing the dissolved pigment from remaining undissolved vegetable solids and from said aqueous phase; and recovering said pigment from said hydrocarbon liquid.

6. The method of producing a vegetable pigment concentrate from a vegetable substance containing water and also containing a vitamin or pro-vitamin vegetable pigment which is substantially insoluble in water, which comprises: subjecting such a vegetable substance to a disintegrating operation and adding thereto an acid and another liquid which is miscible with water and which has a coagulating action on certain proteins present in said vegetable substance, to form a pulp comprising a mixture of divided vegetable solids and an aqueous liquid containing said other liquid and water removed from said vegetable substance and having a moderate acidity; subjecting said pulp to an expressing operation to separate the major portion of said aqueous liquid from undissolved vegetable solids containing said pigment; subjecting the separated vegetable solids to extraction with a hydrocarbon liquid having a high solvent action for said pigment, in the presence of sufficient acid to provide a moderate acidity in the aqueous phase containing water remaining in said separated vegetable solids, to extract said pigment from said solids and cause the extracted pigment to be dissolved substantially wholly in said hydrocarbon liquid; separating said hydrocarbon liquid containing the dissolved pigment from the remaining undissolved vegetable solids and from said aqueous phase; and recovering said pigment from said hydrocarbon liquid.

7. The method of producing a vegetable pigment concentrate from a vegetable substance containing water and also containing a vitamin or pro-vitamin vegetable pigment which is substantially insoluble in water, which comprises: subjecting such a vegetable substance to a disintegrating operation to form a pulp containing water and divided vegetable solids; adding sufficient acid to provide a moderate acidity in the aqueous liquid present in said pulp; separating the major portion of the aqueous liquid from undissolved vegetable solids containing said pigment; subjecting the separated vegetable solids to extraction with a hydrocarbon liquid having a high solvent action for said pigment, together with another liquid which is miscible with water and has a limited solublity in said hydrocarbon liquid and which has a dehydrating action on said vegetable solids, to extract said pigment from said solids and cause the extracted pigment to be dissolved substantially wholly in said hydrocarbon liquid, and to also form an aqueous phase containing said other liquid and additional water derived from the separated vegetable solids; separating said hydrocarbon liquid containing the dissolved pigment from the remaining undissolved vegetable solids and from said aqueous phase; and recovering said pigment from said hydrocarbon liquid.

8. The method of producing a vegetable pigment concentrate from a vegetable substance containing water and also containing a vitamin or pro-vitamin vegetable pigment which is substantially insoluble in water, which comprises: subjecting such a vegetable substance to a disintegrating operation and adding thereto an acid and a water-miscible liquid having a coagulating action on certain proteins present in said vegetable substance, to form a pulp comprising a mixture of divided vegetable solids and an aqueous liquid containing said added liquid and water removed from said vegetable substance and having a moderate acidity; subjecting said pulp to an expressing operation to separate the major portion of said aqueous liquid from undissolved vegetable solids containing said pigment; subjecting the separated vegetable solids to extraction with a hydrocarbon liquid having a high solvent action for said pigment, together with another liquid which is miscible with water and has a limited solubility in said hydrocarbon liquid and which has a dehydrating action on said vegetable solids, to extract said pigment from said solids and cause the extracted pigment to be dissolved substantially wholly in said hydrocarbon liquid, and to also form an aqueous phase containing said other liquid and additional water derived from the separated vegetable solids; separating said hydrocarbon liquid containing the dissolved pigment from the remaining undissolved vegetable solids and from said aqueous phase; and recovering said pigment from said hydrocarbon liquid.

9. The method of producing a vegetable pigment concentrate from a vegetable substance containing water and also containing a vitamin or pro-vitamin vegetable pigment which is substantially insoluble in water, which comprises: subjecting such a vegetable substance to a disintegrating operation and adding thereto an acid and a water-miscible liquid having a coagulating action on certain proteins present in said vegetable solids, to form a pulp comprising a mixture of divided vegetable solids and an aqueous liquid containing said added liquid and having a moderate acidity; separating the major portion of said aqueous liquid from undissolved vegetable solids containing said pigment; subjecting the separated vegetable solids to extraction with a hydrocarbon liquid having a high solvent action for said pigment, together with another liquid which is miscible with water and which has a limited solubility in said hydrocarbon liquid and which has a dehydrating action on said vegetable solids, in the presence of sufficient acid to provide a moderate acidity in the aqueous phase containing said other liquid and additional water derived from said separated vegetable solids, to extract said pigment from said solids and cause the extracted pigment to be dissolved substantially wholly in said hydrocarbon liquid; separating said hydrocarbon liquid containing the dissolved pigment from the remaining undissolved vegetable solids and from said aqueous phase; and recovering said pigment from said hydrocarbon liquid.

10. The method of producing concentrated products containing certain nutritive constituents of alfalfa, which comprises: subjecting water-containing alfalfa, in divided condition, to extraction with a hydrocarbon liquid together with another liquid which is miscible with water and has a limited solubility in said hydrocarbon liquid and which has a dehydrating action on the alfalfa, in the presence of sufficient acid to provide a moderate acidity in the aqueous phase containing said other liquid and water removed from the alfalfa, to extract carotene from the alfalfa and cause the extracted carotene to be dissolved substantially wholly in said hydrocarbon liquid, and to also extract from said alfalfa vitamin and protein material soluble in said aqueous phase; separating the undissolved alfalfa solids; separating said hydrocarbon liquid containing the extracted carotene from said aqueous phase containing said extracted vitamin and protein material; recovering the carotene from said hydrocarbon liquid; and separately recovering the vitamin and protein material from said aqueous phase.

11. The method of producing concentrated products containing certain nutritive constituents of alfalfa, which comprises: subjecting water-containing alfalfa to a disintegrating operation and adding thereto an acid and a water-miscible liquid having a coagulating action on certain proteins present in said alfalfa, to form a pulp comprising a mixture of divided alfalfa solids and an aqueous liquid containing said added liquid and water removed from said alfalfa and having a moderate acidity, and to cause dissolution in said aqueous liquid of vitamin and protein constituents of the alfalfa which are soluble in said liquid; separating the major portion of said aqueous liquid from undissolved alfalfa solids; recovering the dissolved vitamin and protein constituents from the separated aqueous liquid; subjecting the separated undissolved alfalfa solids to extraction with a hydrocarbon liquid in the presence of sufficient acid to provide a moderate acidity in the aqueous phase containing water remaining in said separated solids, to extract carotene from said solids and cause the extracted carotene to be dissolved substantially wholly in said hydrocarbon liquid; separating said hydrocarbon liquid containing the dissolved carotene from the remaining undissolved solids and from said aqueous phase; and recovering the carotene from said hydrocarbon liquid.

WILLIAM H. TEST.